June 7, 1927.   J. A. STRAITS   1,631,941

TIRE REGROOVING TOOL

Filed Feb. 15, 1923

INVENTOR
Joseph A. Straits
BY
R. A. Drogner
ATTORNEY

Patented June 7, 1927.

1,631,941

UNITED STATES PATENT OFFICE.

JOSEPH A. STRAITS, OF AKRON, OHIO, ASSIGNOR TO THE GOODYEAR TIRE & RUBBER COMPANY, OF AKRON, OHIO, A CORPORATION OF OHIO.

TIRE-REGROOVING TOOL.

Application filed February 15, 1923. Serial No. 619,327.

My invention relates to rubber cutting tools and it particularly relates to a form of cutting edge for use in tools for regrooving tires.

Tools for cutting grooves in the tread surfaces of tires have previously been proposed which embodied substantially V-shaped cutting edges somewhat of the form of a gouge commonly used in wood working. It was found in the cutting of grooves in the process of forming tread indentures in solid and semi-pneumatic rubber tires, that a cutting tool having a V-shaped cutting edge that was sharpened by grinding away the material on the inside of the V, had a tendency to cut increasingly deeper into the material of the tire during the grooving operation. On the other hand if the tool were sharpened by grinding away the material on the outside of the V, so that the shank of the tool was of larger cross section than the cutting edge of the tool, the latter would have a tendency to climb out of the groove.

Because of the lack of control of the depth at which a tool of this type would cut, considerable difficulty was experienced in obtaining grooves of uniform depth in the tread surfaces of regrooved tires.

I have found, however, that by notching the cutting edge of the tool it would maintain its direction and depth of cut without an increase of effort on the part of the operator, particularly when driven by an air hammer.

For a better understanding of my invention, reference may now be had to the accompanying drawings forming a part of this specification, of which:

Fig. 1 of the accompanying drawing is a front end view of a holder and cutting tool constructed in accordance with my invention;

Figure 1:
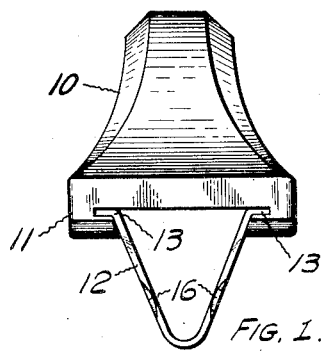
Figure 2:
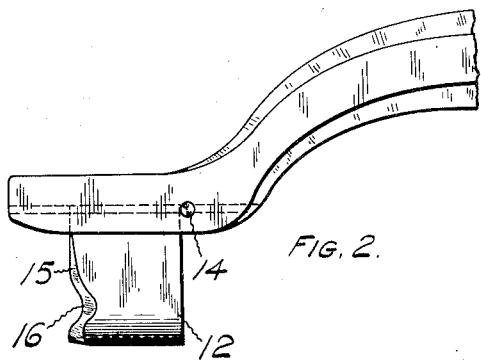
Fig. 2 is a side elevational view of the tool shown in Fig. 1.

The form of tool shown in Fig. 1 and Fig. 2 embodies a holder 10 having a slotted foot 11 that is adapted to receive a removable blade 12. Each of the blades 12 has a pair of laterally extending ears 13 that fit within a suitable groove in the foot 11 of the tool to secure the blade in place. A pin 14, that extends laterally across the groove at the shank of the tool, forms an abutment against which the blade 12 seats during the operation of the tool. The blade 12 is sufficiently resilient to maintain itself in place and is provided with a cutting edge 15 formed on one side thereof.

My invention consists in forming notches 16 in the cutting edge of the blade 12, as clearly indicated in Figs. 1 and 2.

Figure 3:
Figs. 3 and 4 are each side elevational views of a modified form of tool adapted to be used in the holder shown in Figs. 1 and 2.
Figure 4:
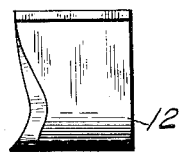

Fig. 3 shows a blade 12 that has a pair of notches 17 and 18 formed in its cutting edge, and Fig. 4 shows a blade 12 that is sharpened on the inside, instead of on the outside as in the other instance, and which embodies a notch of greater proportion than those shown in the other figures.

Figures 5, 6, 7:
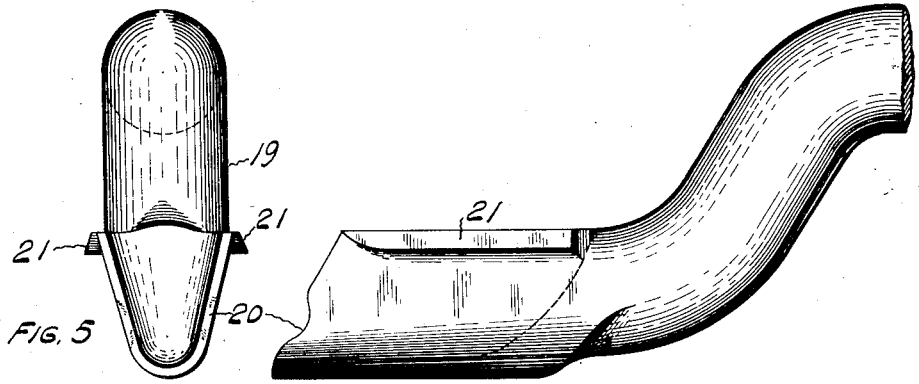
Fig. 5 is a front end elevational view of a modified form of tool.
Fig. 6 is a side elevational view of a tool shown in Fig. 5.
Fig. 7 is a top plan view of the tool shown in Fig. 6.

Figs. 5, 6 and 7 illustrate a modified form of tool 19 that also has a notch 20 formed in its cutting edge. The greatly improved operation that results from forming a notch in the cutting edge of a tool of this character is believed to be caused by the formation of a lip on the lowermost cutting edge of the tool which enables the tool to be more easily directed to cut a deeper or more shallow slot in the tread surface of the tire. The use of a plurality of notches in the cutting edge is indicated in Fig. 3. This also improves the wearing qualities of the edge of the tool. This tool also has a pair of flanges 21 that limit the depth of groove that can be cut by the tool. This is a very effective protection against mutilation of a tire by inexperienced or careless operators.

An additional advantage of notching the cutting edge of a tool of this type is that the tool may be sharpened from the outside, as shown in Figs. 1, 2 and 3 of the accompanying drawing rather than from the inside as is necessary where the blade is not notched. It is far less expensive to grind blades of this type from the outside than from the inside.

Although I have described only a few preferred forms of my invention, it may obviously be extended to include various other forms of notches in the cutting edge of a regrooving tool and therefore I desire that only such limitations shall be imposed as are set forth in the accompanying claims.

What I claim is:

1. A tool for cutting grooves in rubber compound comprising a cutting edge of substantially V-shape and having a plurality of notches therein said notches being spaced from the apex of the edges forming the said V-shape.

2. A tool for cutting grooves in rubber compound having a notched cutting edge of substantially V-shape, the notched portion of the edge being spaced from the apex of the V-shape.

3. A tool for cutting grooves in tire treads having a substantially V-shaped cutting edge, the point of the V being the leading cutting point of the edge.

4. A tool for cutting grooves in tire treads having a substantially V-shaped cutting edge, the point of the V being the leading cutting point of the edge and a notch formed in the cutting edge of the tool adjacent the most leading point.

5. A tool for cutting notches in tire treads having a cutting edge sloping back from the most advanced cutting point of the tool, and a plurality of notches in the cutting edge immediately following said advanced cutting point.

6. A tool for cutting notches in tire treads having a cutting edge sloping back from the most advanced cutting point of the tool, and a plurality of notches in the cutting edge immediately following said advanced cutting point, said tool having a flange adapted to limit the depth of groove made by said tool.

In witness whereof, I have hereunto signed my name.

JOSEPH A. STRAITS.